United States Patent
Honnappa et al.

(10) Patent No.: US 11,366,713 B2
(45) Date of Patent: Jun. 21, 2022

(54) SYSTEM AND METHOD FOR AUTOMATICALLY IDENTIFYING AND RESOLVING COMPUTING ERRORS

(71) Applicant: Accenture Global Solutions Limited, Dublin (IE)

(72) Inventors: Vidyasagar Honnappa, Bangalore (IN); Chandramouli Muralitharan, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 170 days.

(21) Appl. No.: 16/853,497

(22) Filed: Apr. 20, 2020

(65) Prior Publication Data

US 2021/0326197 A1 Oct. 21, 2021

(51) Int. Cl.
*G06F 11/00* (2006.01)
*G06F 11/07* (2006.01)
*G06N 5/02* (2006.01)
*G06F 16/17* (2019.01)

(52) U.S. Cl.
CPC ........ *G06F 11/079* (2013.01); *G06F 11/0709* (2013.01); *G06F 11/0772* (2013.01); *G06F 11/0787* (2013.01); *G06F 16/1734* (2019.01); *G06N 5/022* (2013.01)

(58) Field of Classification Search
CPC ............... G06F 11/0793; G06F 11/079; G06F 11/0781; G06F 11/3476; G06F 11/0766; G06F 11/0778; G06F 11/366; G06F 11/3452; G06F 11/2257; G06F 11/3466; G06F 11/321; G06F 11/3636
See application file for complete search history.

(56) References Cited

U.S. PATENT DOCUMENTS

| | | | |
|---|---|---|---|
| 8,166,348 B1 * | 4/2012 | Kulkarni | G06F 11/0793 714/38.1 |
| 2009/0222436 A1 * | 9/2009 | Nastacio | G06F 16/334 |
| 2013/0311836 A1 * | 11/2013 | Hurst | H04L 67/303 714/48 |
| 2016/0117211 A1 * | 4/2016 | Makuch | G06N 5/022 705/39 |

* cited by examiner

*Primary Examiner* — Charles Ehne
(74) *Attorney, Agent, or Firm* — Plumsea Law Group, LLC

(57) ABSTRACT

The proposed system and method provide streamlined procedures for automatically identifying and resolving computing errors that improve efficiency and accuracy by providing a way to automatically monitor log files, automatically find and identify errors in the log files, automatically find solutions the identified errors from a variety of sources, and automatically implement the found solutions. The system and method further provide streamlined procedures that use cognitive learning (e.g., machine learning) to learn new solutions that are manually defined and implemented by a user to resolve the automatically found and identified errors, and then automatically finding and implementing the new solutions in subsequent cycles.

20 Claims, 6 Drawing Sheets

SYSTEM AND METHOD FOR AUTOMATICALLY IDENTIFYING AND RESOLVING COMPUTING ERRORS

TECHNICAL FIELD

The present disclosure generally relates to using automatically identifying and resolving computing errors. The present disclosure further relates to using cognitive learning to save manual solutions for resolving computing errors in a knowledge base that is automatically searched for solutions to errors that are automatically found and identified.

BACKGROUND

Information technology operations teams currently manually monitor applications for errors. Once an error is found, the operations team creates a ticket, and assigns the ticket to a different team that: performs an analysis to identify the root cause of the error and creates, integrates, tests, and deploys a solution. This process if very time consuming and inefficient.

There is a need in the art for a system and method that addresses the shortcomings discussed above.

SUMMARY

The proposed system and method provide streamlined procedures for automatically identifying and resolving computing errors that improve efficiency and accuracy by providing a way to automatically monitor log files, automatically find and identify errors in the log files, automatically find solutions the identified errors from a variety of sources, and automatically implement the found solutions. The system and method further provide streamlined procedures that use cognitive learning (e.g., machine learning) to learn new solutions that are found in an external site or that are manually defined and implemented by a user to resolve the automatically found and identified errors, and then automatically finding and implementing the new solutions in subsequent cycles. By learning from manual solutions and solutions in external sites and building a knowledge base where these manual solutions and solutions in external sites are saved for future automatic retrieval, the system and method improve efficiency over the course of subsequent cycles.

The system and method decrease maintenance of applications by having fewer dependencies on other application components. In some embodiments, the system and method decrease maintenance of distributed applications. Distributed applications (distributed apps) are applications or software that runs on multiple computers within a network at the same time and can be stored on servers or with cloud computing. In some embodiments, the system and method use DevOps to integrate solutions. DevOps integrates developers and operations teams in order to improve collaboration and productivity by automating infrastructure and workflows, and continuously measuring application performance. DevOps teams try to automate code testing, workflows, and how infrastructure is provisioned. DevOps includes an iterative process of writing software in small chunks that are integrated, monitored, and deployed over the course of hours, rather than a large chunk of software going through the same steps over the course of weeks. DevOps teams write configuration management code that describes how things (e.g., number of web servers, hardware specs, operating system, software packages, install scripts) should be built.

The disclosed system and method provide end-to-end automation from the identification of the issue to deployment, which improves efficiency by reducing the number of times a human must provide intervention. The disclosed system and method provide flexibility and granularity by having the ability to be customized to meet the business needs of service consumers.

In one aspect, the disclosure provides a computer implemented method of automatically identifying and resolving computing errors. The method may include receiving a first log file that includes log records generated by an application. The method many further include automatically identifying text indicating a first error in the first log file. The method many further include automatically extracting error details from the first log file. The method many further include automatically using the text indicating the first error and the error details to search a knowledge base and/or an external site for an existing solution for resolving the first error. The method many further include upon finding a plurality of existing solutions when searching for an existing solution, automatically performing the following: (1) determining whether accuracy is defined in the text accompanying each of the existing solutions, (2) upon determining that accuracy is defined, automatically determining the existing solution of the plurality of existing solutions that has the highest defined accuracy, and (3) implementing the existing solution with the highest defined accuracy. The method many further include storing the selected solution in knowledge base.

In yet another aspect, the disclosure provides a non-transitory computer readable medium storing software that may comprise instructions executable by one or more computers which, upon execution, cause the one or more computers to: (1) receive a first log file that includes log records generated by an application; (2) automatically identify text indicating a first error in the first log file; (3) automatically extract error details from the first log file; (4) automatically use the text indicating the first error and the error details to search a knowledge base and/or an external site for an existing solution for resolving the first error; (5) upon finding a plurality of existing solutions when searching for an existing solution, automatically perform the following: (a) determine whether accuracy is defined in the text accompanying each of the existing solutions, (b) upon determining that accuracy is defined, automatically determine the existing solution of the plurality of existing solutions that has the highest defined accuracy, and (c) implement the existing solution with the highest defined accuracy. The instructions may be executable to further cause the one or more computers to store the selected solution in knowledge base.

In yet another aspect, the disclosure provides a system for automatically identifying and resolving computing errors, which comprises one or more computers and one or more storage devices storing instructions that may be operable, when executed by the one or more computers, to cause the one or more computers to: (1) receive a first log file that includes log records generated by an application; (2) automatically identify text indicating a first error in the first log file; (3) automatically extract error details from the first log file; (4) automatically use the text indicating the first error and the error details to search a knowledge base and/or an external site for an existing solution for resolving the first error; (5) upon finding a plurality of existing solutions when searching for an existing solution, automatically perform the following: (a) determine whether accuracy is defined in the text accompanying each of the existing solutions, (b) upon determining that accuracy is defined, automatically determine the existing solution of the plurality of existing solutions that has the highest defined accuracy, and (c) implement the existing solution with the highest defined accuracy. The instructions may be executable to further cause the one or more computers to store the selected solution in knowledge base.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
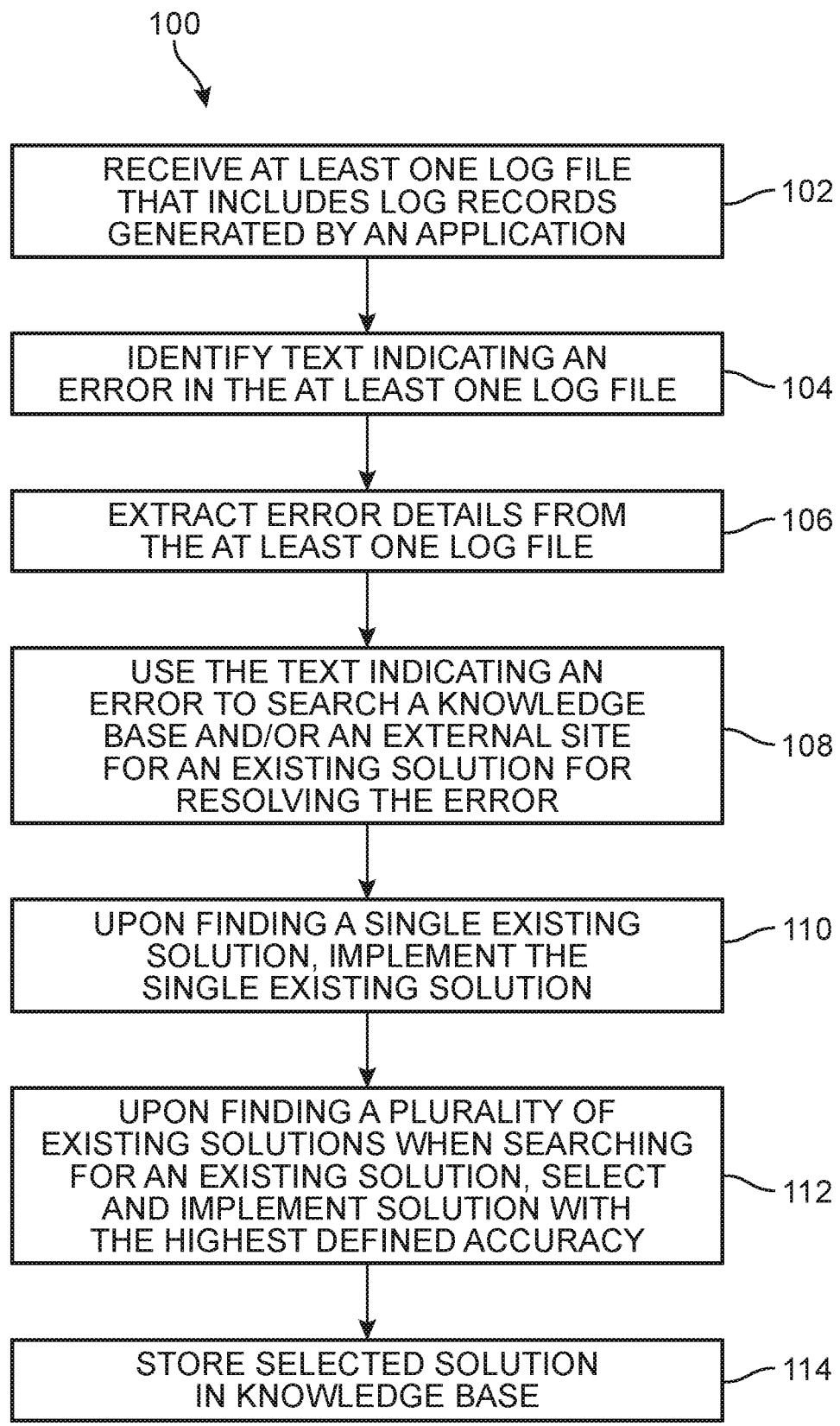
FIG. 1 shows a method of automatically identifying and resolving a computing error, according to an embodiment.

FIG. 1 shows a flowchart illustrating a method of automatically identifying and resolving a computing error 100 (or method 100), according to an embodiment. Method 100 includes receiving at least one log file that includes log records generated by an application (operation 102). Method 100 includes identifying text indicating an error in the at least one log file (operation 104). Method 100 includes extracting error details from the at least one log file (operation 106). Method 100 includes using the text indicating an error and the error details to search a knowledge base and/or an external site for an existing solution for resolving the error (operation 108). Method 100 includes implementing a single existing solution upon finding that only a single solution exists (operation 110). Method 100 includes selecting and implementing a solution with the highest defined accuracy upon finding a plurality of existing solutions when searching for an existing solution (operation 112). Method 100 includes storing the selected solution in a knowledge base (operation 114). Each of these operations are described in more detail below.

Figure 2:
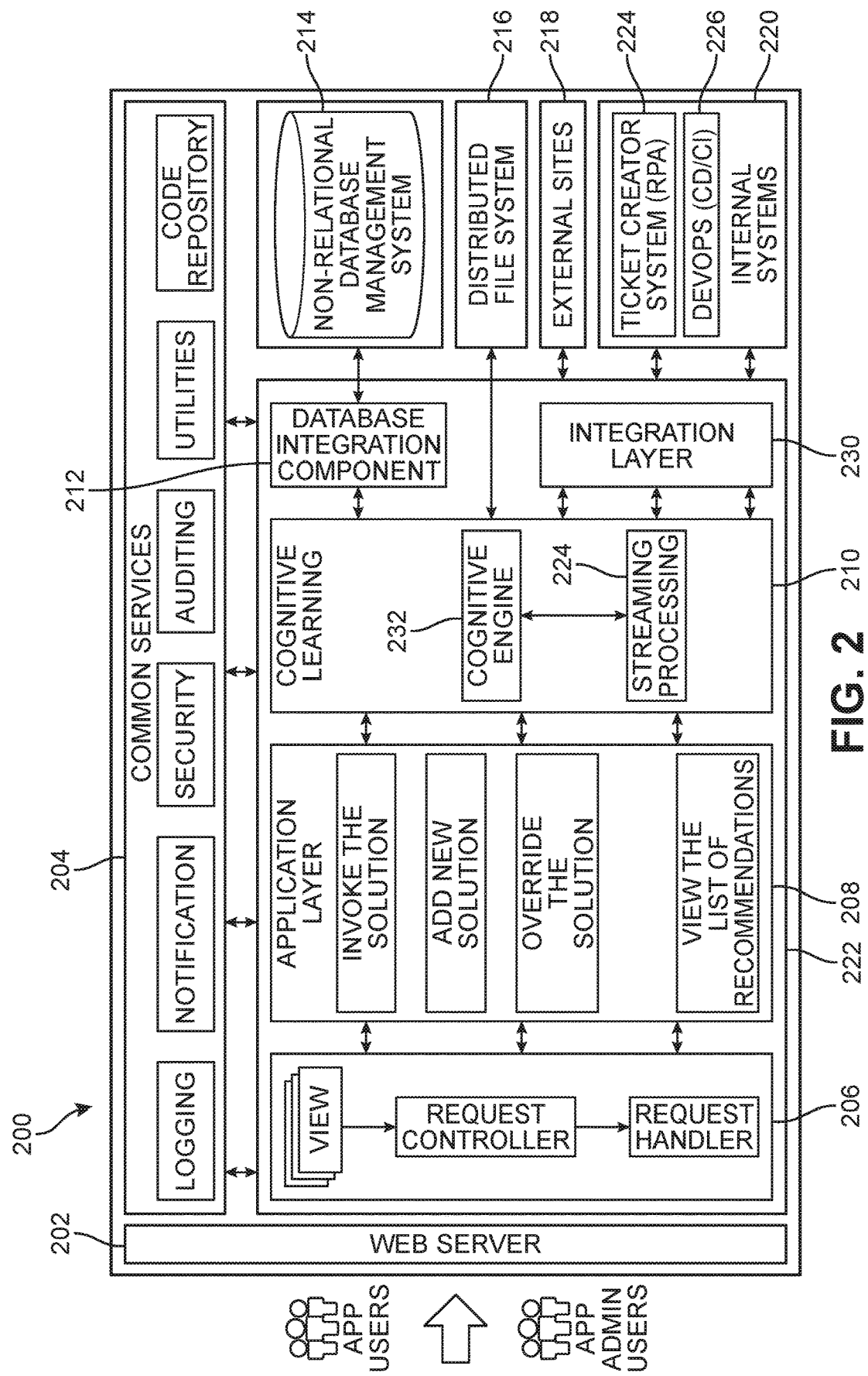
FIG. 2 illustrates an architecture for automated application maintenance 200, according to an embodiment.

FIG. 2 illustrates a diagram of an architecture for automated application maintenance 200 (or architecture 200), according to an embodiment. Architecture 200 includes a web server 202 that processes network requests from clients to store, process, and deliver web pages to clients. Architecture 200 includes common services, which may include logging, notification, security, auditing, utilities, and code repository.

Architecture 200 includes a processor 222 having a presentation layer 206, which may include a view/interface, request controller, and request handler. Architecture 200 includes an application layer 208 that includes different options for handling an error. For example, options may include viewing a list of recommendations, overriding an automatically selected solution, adding a new solution, and invoking a solution. Architecture 200 includes a cognitive learning module 210, which may include a cognitive engine 232 (e.g., machine learning and/or deep learning engine) and streaming processes 224 (e.g., Spark Streaming, an open source scalable fault-tolerant streaming processing system that natively supports both batch and streaming workloads). As discussed below with respect to FIG. 4, cognitive engine 232 may define solutions found on external sites and select a solution based on machine learning and/or deep learning. Architecture 200 includes an integration layer 230, which may route messages and implement enterprise integration patterns. For example, integration layer 230 may include web services and a message broker to carry out these duties. Integration layer 230 can integrate with external community sites, as well as DevOps. An app may be implemented on the integration layer. Architecture 200 includes a database integration component 212.

As shown in FIG. 2, architecture 200 includes a non-relational distributed database management system 214 (e.g., Apache Hbase, MongoDB, Apache CouchDB™, Amazon DynamoDB, etc.), which may store documents containing text including error names, error details, and/or solutions for resolving related errors. In some embodiments, a relational distributed database management system may be used in place of the non-relational distributed database management system. In yet other embodiments, other types of database management systems may be selected based on certain considerations, for example, the type of application at hand.

Architecture 200 includes a distributed file system 216. An example of a distributed file system is Hadoop Distributed File System (HDFS). Distributed file system 216 communicates with cognitive learning module 210 to implement solutions. Cognitive learning means saving new solutions to your knowledge base and then using those solutions in future cycles. Architecture 200 includes external sites 218 and internal systems 220. External sites may include the Uniform Resource Locators (URLs) for websites. Examples of external sites may include websites for products, such as Techform, DZone, or Stack Overflow. External URL details may be provided by the non-relational distributed database management system based on the type of error and details in accordance with designed patterns or templates. In some embodiments, URL normalization may be performed to modify and standardize URLs of external sites in a consistent manner. The goal of the normalization process is to transform a URL into a normalized URL so it is possible to determine if two syntactically different URLs may be equivalent. In some embodiments, URL filtering may be used to control access to certain websites and record log messages for access actions.

Internal systems 220 may include a ticket creator system (e.g., robotic process automation (RPA)) 224 and DevOps continuous integration/continuous development (CI/CD) 226. Ticket creator system 224 can automatically create incident tickets. DevOps CI/CD 226 can handle matters in a CI/CD pipeline. For example, see embodiment described below with respect to FIG. 6.

Figure 3:
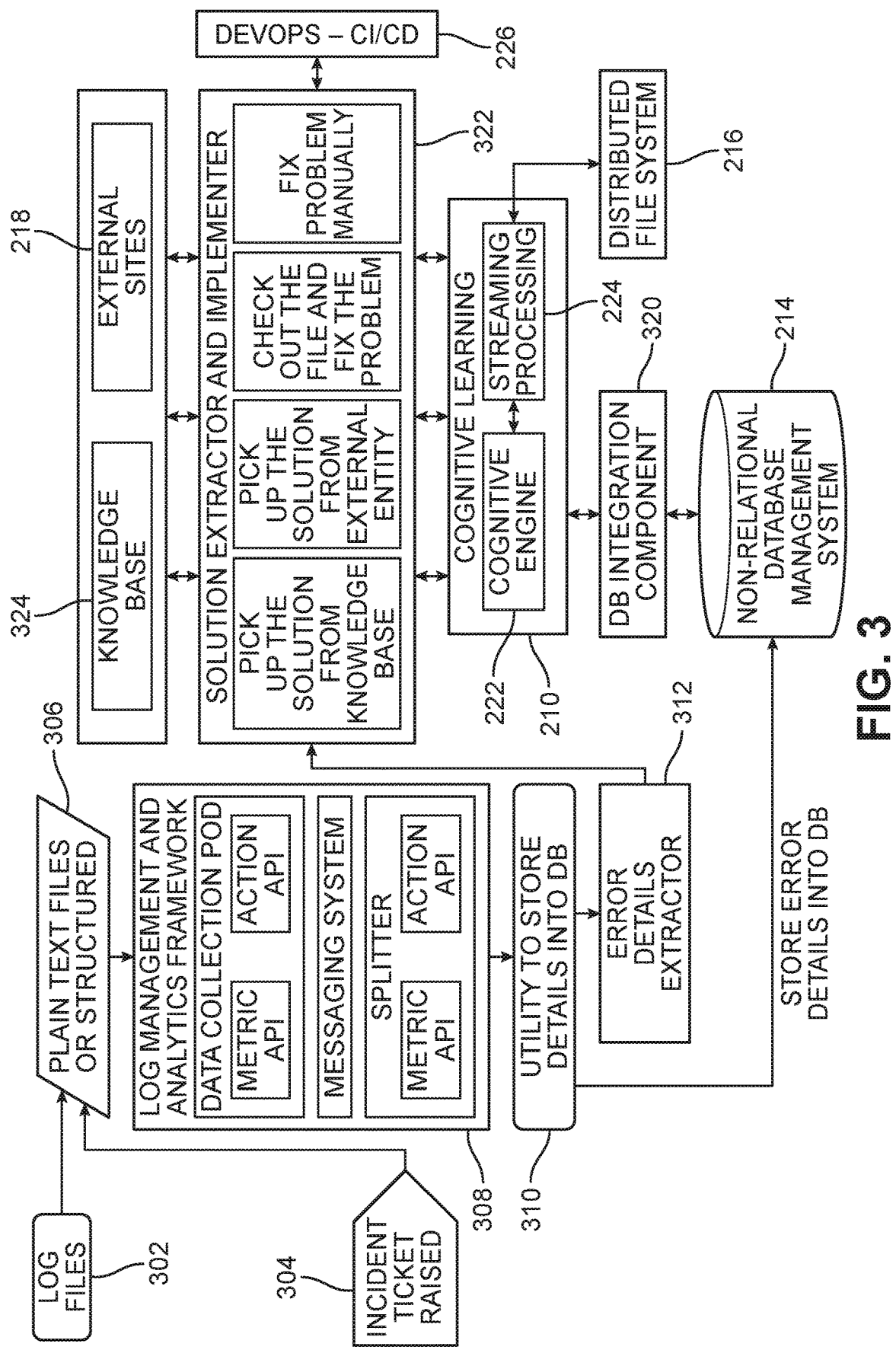
FIG. 3 illustrates a system for automatically identifying and resolving a computing error, according to an embodiment.

FIG. 3 illustrates a system for automatically identifying and resolving a computing error 300 (or system 300), according to an embodiment, as well as a broad overview of how some of the components interact. In the embodiment shown in FIG. 3, the system is implemented for a distributed application and includes some of the components from architecture 200. System 300 may include a utility to store details in a database 310, a database integration component 320, non-relational distributed database management system 214, distributed file system 216, cognitive learning module 210, and DevOps CI/CD 226.

Figure 4:
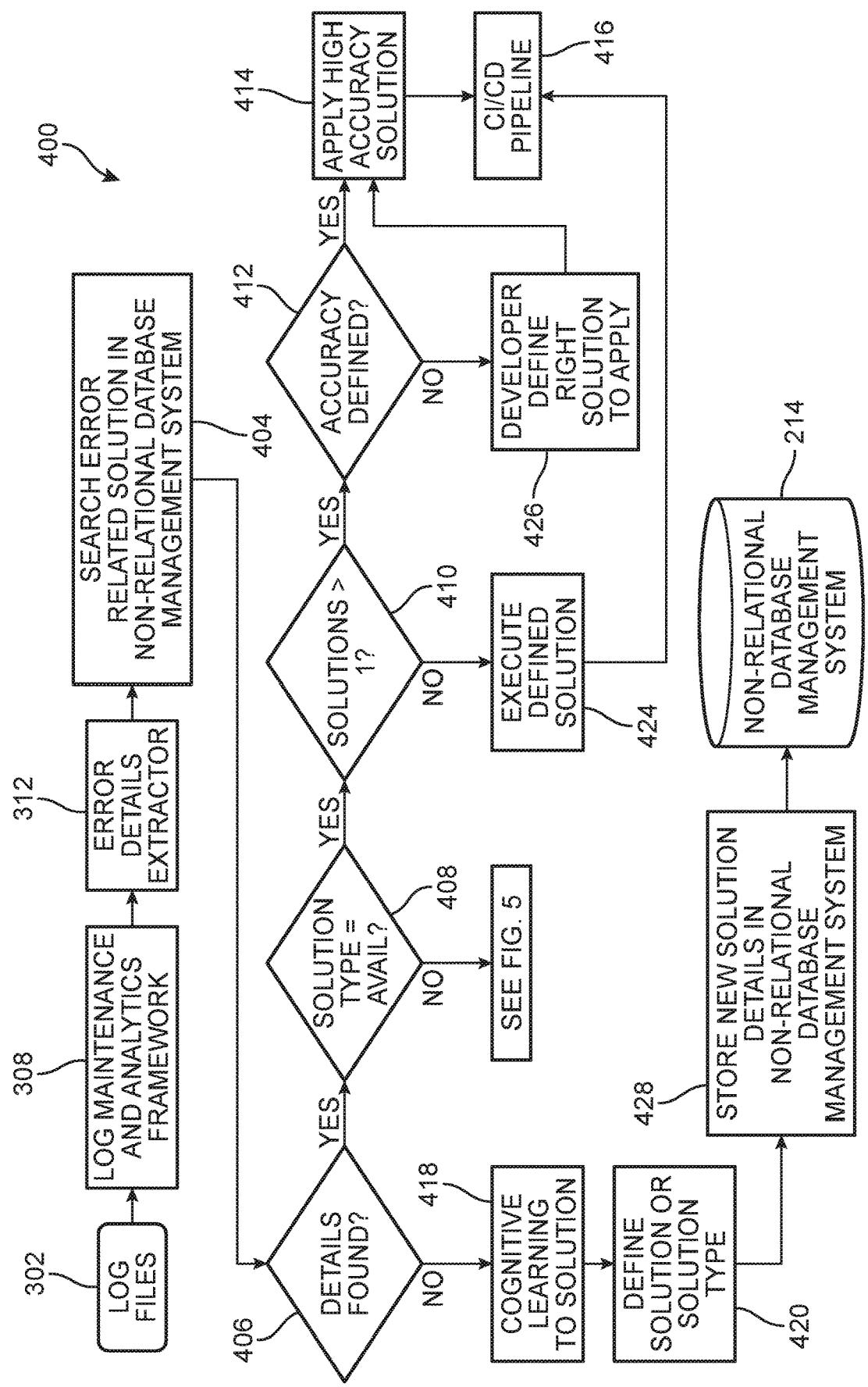
FIG. 4 shows a flowchart illustrating a method of automatically identifying and resolving a computing error, according to an embodiment.

FIG. 4 shows a flowchart illustrating a method of automatically identifying and resolving a computing error, according to an embodiment. As shown in FIGS. 3 and 4, input may include log files 302. Method 100 includes receiving at least one log file that includes log records generated by an application (operation 102). Log files may come from various sources, such as application logs, server logs, and user interface logs, and may include error messages. In some embodiments, a centralized logging system may be used to store all logs at one place from multiple servers or distributed systems. In some embodiments, instead of or in addition to receiving log files, the method of automatically identifying and resolving a computing error may include receiving incident tickets that have been generated in response to users reporting incidents and/or as automated incident alert systems. For example, FIG. 3 shows incident ticket raised 304 as input. In another example, in some embodiments, log files may contain information indicating that a ticket has been generated. In some embodiments, the method of automatically identifying and resolving a computing error may further include transforming log information into reports and/or predetermined/structured formats (e.g., JSON). These formats may vary based on the type of details being invoked. As shown in the embodiment of FIG. 3, log files 302 and incident tickets raised 304 may be transformed into structured format that is included as input containing either plain text file form or in a structured format 306.

As shown in FIG. 3, system 300 may include a log management and analytics framework 308. Log management and analytics framework 308 may include a data collection pod made up of a metric API and an action API. Log management and analytics framework 308 may include a splitter made up of a metric API and an action API. Log management and analytics framework 308 may include a messaging system that parses logs with Application/Project/Module name and Default/Custom defined exceptions. Loggly Framework (open source) is an example of a log maintenance and analytics framework that can provide error text, a metric API, an action API, or incident tickets raised (e.g., can come from a call or log files), and can store error messages and reports in a database management system (e.g., HBase). Loggly is cloud-based and uses open source technologies, including Elasticsearch, Apache Lucene, and Apache Kafka. Loggly Framework can record log data from one or more devices and can report the log data in a real-time management platform with trend data. Other examples of a log maintenance and analytics frameworks include Logz.io or Datadog.

In some embodiments, the method of automatically identifying and resolving a computing error may further include using the log maintenance and analytics framework to analyze the logs. For example, as shown in FIGS. 3 and 4, log maintenance and analytics framework 308 may analyze the logs. In some embodiments, log maintenance and analytics framework 308 may analyze the logs in a specified format to understand defined use cases for troubleshooting. As shown in the embodiment of FIG. 3, log files 302 and incident tickets raised 304 are submitted as input in either plain text file form or in a structured format 306 into log management and analytics framework 308.

The log maintenance and analytics framework may generate reports based on analysis of raw log files and/or incident tickets. For example, in some embodiments, the log maintenance and analytics framework may generate a stack trace. A stack trace is a human-readable report of the active frames at a certain point in time during the execution of a program. A stack trace can track the sequence of functions, procedures, or invocations that were called until to the point where the stack trace is generated. This is usually a position at which an exception takes place. When printed out, the generation point shows up first, and the method invocations leading to that point are displayed underneath. This printing order illuminates when an exception occurs and helps determine the cause of failure by including the actions leading up to the exception. In embodiments in which a stack trace is generated, identifying text indicating an error in the at least one log file may include searching for text indicating an exception in a stack trace. Examples of more specific errors are discussed below.

As previously mentioned, method 100 includes identifying text indicating an error in the at least one log file (operation 104). In some embodiments, identifying text indicating an error in the at least one log file may include searching the file names of log files or the text of log files or reports generated from analysis of log files for text indicating that an error has occurred. For example, text including "error," "err," "exception," "failure," "failed," "crash," and/or "ticket" may indicate that an error has occurred. In another example, text indicating more specific error messages may be searched for in raw log files or reports generated by the log maintenance and analytics framework.

As shown in FIG. 3, utility to store details into database 310 may be used to store error messages found, reports generated, and other details from analysis performed by log management and analytics framework 308. These details may be stored in non-relational distributed database management system 214. System 300 may include an error details extractor 312 and a solution extractor and implementer 322, which includes multiple options for finding a solution to the error. For example, solution extractor and implementer 322 includes the option of "pick up the solution from the knowledge base." In this example, the knowledge base may be a knowledge base 324 or may be non-relational distributed database management system 214. Another option for solution extractor and implementer 322 includes "pick up the solution from external entity," which is consistent with operation 108. The details from analysis performed by log management and analytics framework 308 may be used by the error details extractor 312 to look for error details, in accordance with operation 106, and may be used by solution extractor and implementer 322 to find a solution from knowledge base, in accordance with operation 312.

While not shown in FIG. 2, it is understood that error details extractor 312 and solution extractor and implementer 322 may both be included in processor 222. For example, these components, as well as other components may be hosted on a computing system. The computing system may include at least one processor and memory for storing information, including software information and/or data. The processor may include a single device processor located on a single device, or it may include multiple device processors located on one or more physical devices. The memory may include any type of storage, which may be physically located on one physical device, or on multiple physical devices.

The computing system may communicate with other systems over a network. For example, the computing system may retrieve previously applied solutions from the non-relational database management system via a network. In some embodiments, the network may be a wide area network, e.g., the Internet. In other embodiments, the network may be a local area network.

Another option for solution extractor and implementer 322 includes "check out the file and fix the problem," which is consistent with operations 110 and 112. Yet another option for solution extractor and implementer 322 includes "fix the problem manually," which may be selected if a solution is not found in the knowledge base or in external sites.

In some embodiments, error details extractor 312 may be used to extract error details from an input log or report (e.g., Loggly reports) in specified format or template designed. For example, the input log or report may have a structured data format. Examples of the error details extractor fetching details from a report generated by the log maintenance and analytics framework may include retrieving details for a use case in which a log file includes one of the following lines: "crashes due to failure to allocate large pages" or "crashes due to NullPointerException." In some embodiments, the error details extractor may use artificial intelligence (e.g., machine learning and/or deep learning) to find patterns and/or usage details (e.g., services used) to identify error details.

Once the error is identified and details about the error are found, a search may be automatically conducted to find a solution to the error. For example, method 100 includes using the text indicating an error and the error details to search a knowledge base and/or an external site for an existing solution for resolving the error (operation 108). The search may further include using error details extracted by error details extractor 312 to find an existing solution for resolving the error. As shown in FIG. 4, in some embodiments, the non-relational distributed database management system (e.g., Apache Hbase) may be searched first to find solutions to the error that have been successful in the past (operation 404). For example, defined input values, such as text related to the error, may be used to search for a solution. As shown in FIG. 4, searching for solutions in the non-relational distributed database management system may include looking for error related details in the non-relational distributed database management system. If details are found at decision block 406, then the analysis progresses to decision block 408. If no details are found at decision block 406, then the flow progresses to operation 418.

Figure 5:
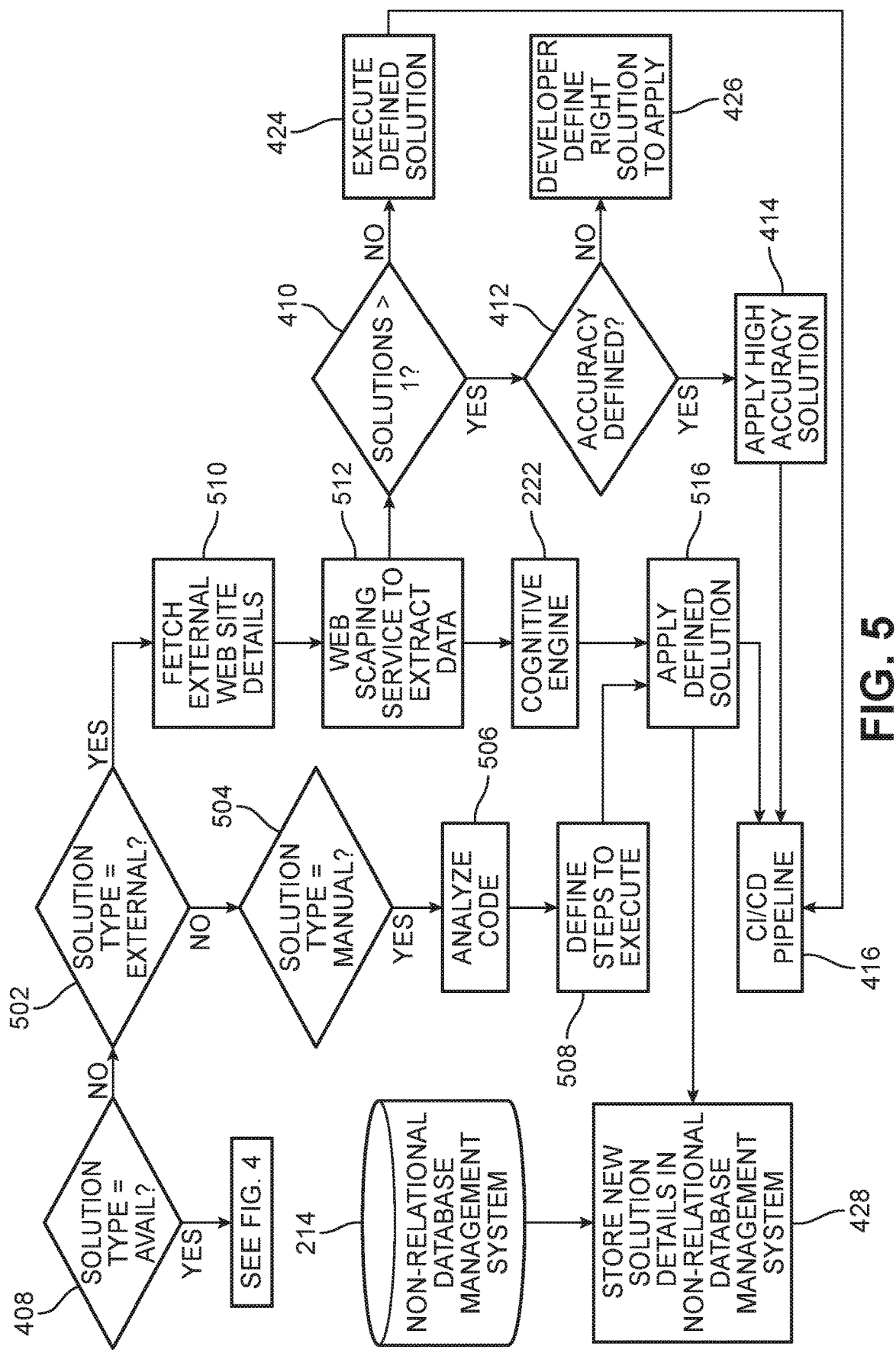
FIG. 5 shows a flowchart illustrating searching for external solutions, according to an embodiment.

Decision block 408 includes determining whether a solution is included in the details. FIG. 5 shows the flow if no solution is found in the details found in the non-relational distributed database management system at decision block 408. If a solution is found in the details found in the non-relational distributed database management system at decision block 408, the analysis continues to decision block 410. Decision block 410 includes determining whether more than one solution exists. Upon finding that only one solution exists at decision block 410, the one found solution is executed at operation 424. For example, operation 110 includes automatically implementing a single existing solution upon finding that only a single solution exists. Then, this solution is continued by the CI/CD pipeline at operation 416.

Upon finding the more than one solution exists at decision block 410, the analysis continues to decision block 412 to determine whether accuracy is defined in the details related to the error. If no accuracy is defined at decision block 412, then a developer defines the appropriate solution to apply at operation 426. Once the developer defines the right solution to apply, which should be the solution having the highest accuracy, then the flow continues to operation 414 where the high accuracy solution is applied at operation 414. Similarly, if accuracy is defined at decision block 412, then the flow continues to operation 414 where the high accuracy solution defined in the details is applied at operation 414. For example, operation 112 includes automatically selecting and implementing a solution with the highest defined accuracy upon finding a plurality of existing solutions when searching for an existing solution. This operation may include the determination of whether accuracy is defined, in addition to selecting the solution with the highest defined accuracy. After applying or executing the high accuracy solution, the solution is continued by the CI/CD pipeline at operation 416.

The following are examples of criteria that may be used to find a solution on an external site that may be applied individually or in combination, including multiple permutations of combinations. In one example, keywords related to the error can be used to find the best match result in a solution. Another example includes using an approximate probability match for keywords of the exact problem statement/error. In yet another example, priority is given to solutions belonging to categories, such as, domain, API, code, executable etc. In yet another example, a problem statement or error that has multiple, repeated answers in the same external link and is marked as solved may be considered a solution. In yet another example, one or more solutions based on a probability solution success factor may be considered a solution. In yet another example, the existing solution of the plurality of existing solutions (e.g., from an external site) that has a successful solution factor greater than 70% based previous history of evaluation this same solution may be considered to have the highest accuracy of the plurality of existing solutions. In yet another embodiment, a solution having a probability of success greater than 90% based on history or cognitive learning may be considered to have a high accuracy (top down mapping approach). In other embodiments, this successful solution factor or probability of success may be set to have different thresholds. For example, these thresholds may be set to a percentage in the range of 60% to 90%.

In yet another example of criteria that may be used to find a solution on an external site, a user's positive feedbacks for a solution may be included in analysis of whether a solution is a high accuracy solution (probability top down approach). In yet another example, priority is given to vendor or product specific forums and blogs.

At operation 418, cognitive learning is applied to find a solution. Once the solution is determined, the solution is defined at operation 420. Then, the defined solution is stored in non-relational distributed database management system 214 at operation 428. For example, operation 114 includes storing the selected solution in a knowledge base. This way, a solution found on an external site or a manually implemented solution may be available in the future when the same error is encountered again. As method 400 is repeated over time, more solutions may become available in non-relational distributed database management system 214. This way, errors may be more seamlessly found, identified, and resolved in an automated manner, thus improving efficiency and reducing computing resources by eliminating the operations necessary to find, identify, and resolve a solution.

As mentioned above, FIG. 5 shows the flow if no solution is found in the details found in the non-relational distributed database management system at decision block 408. First, the flow continues to decision block 502 where a search in external sites determines whether the external sites (e.g., websites, as discussed above) include an explanation of one or more solutions. If the external site includes an explanation of one or more solutions, the flow continues to operation 510 where external site details are retrieved. For example, text may be retrieved from the website. Then, web scraping services are used to extract data at operation 512. For example, extracting data may include using match results based on using a matcher algorithm and/or templates defined by a rules engine. In another example, the web scraping services may be used to find solutions described in the text of the external site. From operation 512, the solutions extracted by web scraping services may be sent to cognitive engine 232 for the cognitive engine 232 to define solutions and select a solution based on machine learning and/or deep learning. Then, the selected solution is applied at operation 516. After applying or executing the selected solution, the solution is continued by the CI/CD pipeline at operation 416 and is stored in the database management system at operation 428. For example, operation 114 includes storing the selected solution in a knowledge base.

After web scraping services are used to extract data at operation 512, the solutions extracted by web scraping services may also be analyzed to determine whether there is more than one solution at decision block 410. From this decision point, the same flow follows as shown in FIG. 4 with respect to decision block 410. To help show the flow in the same view with operation 512, decision blocks 410 and 412, as well as operations 424, 426, 414, and 416 are shown in FIG. 5.

If at decision block 502 it is determined that the external site does not include an explanation of one or more solutions, the flow continues to decision block 504 where it is determined if a manual solution needs to be implemented. If a manual solution needs to be implemented, code for the manual solution must be analyzed at operation 506. After the code is analyzed, the steps for execution of the solution are defined at operation 508. Then, the selected solution is applied at operation 516. After applying or executing the selected solution, the solution is continued by the CI/CD pipeline at operation 416 and is stored in the database management system at operation 428. For example, operation 114 includes storing the selected solution in a knowledge base.

In one example of performing the method of automatically identifying and resolving computing errors operations, the error found and identified is described as "crashes due to failure to allocate large pages." On Linux, failures when allocating large pages can lead to crashes, for example, when running JDK 7u51 or later versions. In this example, one or more of the following steps may be processed by artificial intelligence to identify the error based on the error patterns and/or utilities and services used when the error occurs:

before the crash happens, one or more lines similar to the following example will have been printed to the log: "os::commit_memory(0x00000006b1600000, 352321536, 2097152, 0) failed"; "error='Cannot allocate memory' (errno=12)"; and "cannot allocate large pages, falling back to regular pages"; and if a file named "hs_err" is generated, it will contain a line similar to the following example: "large page allocation failures have occurred 3 times."

More specifically, the error details extractor may use artificial intelligence to perform the following steps upon the discovery of an error message in a Loggly report stating, "crashes due to failure to allocate large pages":

1. fetch error message retried file name; and
2. <file-name> is equal to hs_err;
  2.1. If yes, search for string "large page allocation failures" in error message. If find then errType=Runtime, errSubType=MemoryAllocation, errno=12, errDesc=Message; and
  2.2. if No, search for string "Cannot allocate memory" in error message. If found, then errType=Runtime, errSubType=MemoryAllocation, errno=12, errDesc=Message.

In this example, the following solution is found when searching the knowledge base (e.g., non-relational distributed database management system):

Line #1: cannot allocate large pages; and
Line #2: large page allocation failures have occurred 3 times.

In another example of performing the method of automatically identifying and resolving computing errors operations, the error found and identified is referred to as "stackoverflow error." StackOverFlowError is a commonly confronted JVM error. A thread's stack stores methods the stack executes, as well as primitive datatypes, variables, object pointers, and return values. All of these consume memory. If a thread's stack sizes grow beyond the allocated memory limit, then StackOverflowError is thrown. In this example, one or more of the following steps may be processed by artificial intelligence to identify the stackoverflow error based on the error patterns found in an external site and/or utilities and services used when the error occurs:

using a non-terminating recursive call, which causes threads stack size to grow to a larger size;

using an infinite loop to use the allocated stack size; and causing the thread to execute a large number of methods or local variables/created in the methods thread executed.

In this example, the knowledge base (e.g., non-relational distributed database management system) provides the following external site as a site to search for a solution: https://dzone.com/articles/stackoverflowerror-causes-amp-solutions. More specifically, the error details extractor may use artificial intelligence to perform the following steps upon the discovery of an error message in a Loggly report stating, "crashes due to stackoverflow error":

inputs for algorithm: URL=https://stackoverflow.com/questions/16091520/java-dealing-with-stackoverflow-and-continue-normal-execution-after-stackoverflow, ExceptionType:Runtime, exception Description: StackOverFlowError;

follow approximate tree pattern matching algorithm: Matcher→XPath pattern /div[@class='comment-copy'];

let T1 and T2 be rooted, ordered trees and M a set of tuples from V (T1)×V (T2); a top down mapping M is a mapping for which it holds that if some pair (v, w) ∈M†(root(T1), root(T2)) then (parent(v), parent(w)) ∈M;

retrieve all matches and data extraction site using data extraction utility; and store the data in temporary location in the format of the file which will be used by the cognitive engine to define the solution.

In yet another example of performing the method of automatically identifying and resolving computing errors operations, the error found and identified is referred to as "NullPointerException." NullPointerException is thrown when a program attempts to use an object reference that has the null value.

One or more of the following steps may be processed by artificial intelligence to identify the NullPointerException error based on the error patterns and/or utilities and services used when the error occurs:

invoking a method from a null object;
accessing or modifying a null object's field;
taking the length of a null object, as if it were an array;
accessing or modifying the slots of a null object, as if it were an array;
throwing null, as if it were a throwable value; and
synchronizing over a null object.

More specifically, the error details extractor may use artificial intelligence to perform the following steps upon the discovery of an error message in a Loggly report stating, "crashes due to NullPointerException":

1. fetch error message retried file name;
2. if the error message contains "NullPointerException," then proceed to next steps, otherwise exit from this algorithm;
3. identify the file name where the exception throwing using error message stack trace;
4. analyze code snippet and identify the scenario causing exception like below:
   a. invoking a method from a null object?
   b. accessing or modifying a null object's field?
   c. taking the length of null, as if it were an array?
   d. accessing or modifying the slots of null object, as if it were an array?
   e. throwing null, as if it were a Throwable value?
   f. when you try to synchronize over a null object?
   g. define best patterns and define solution based on above scenarios;
5. apply unit and integration testing and deploy the solution.

In this example, the following solution is manually implemented and then stored in the knowledge base (e.g., non-relational distributed database management system) for use in future cycles:

1. to avoid the NullPointerException ensure that all the objects are initialized properly before using them;
2. when declaring a reference variable, verify that object is not null, before requesting a method or a field from the objects;
3. validate the code and conduct functional behavior impact analysis; and
4. fix the code and deploy fix.

Figure 6:
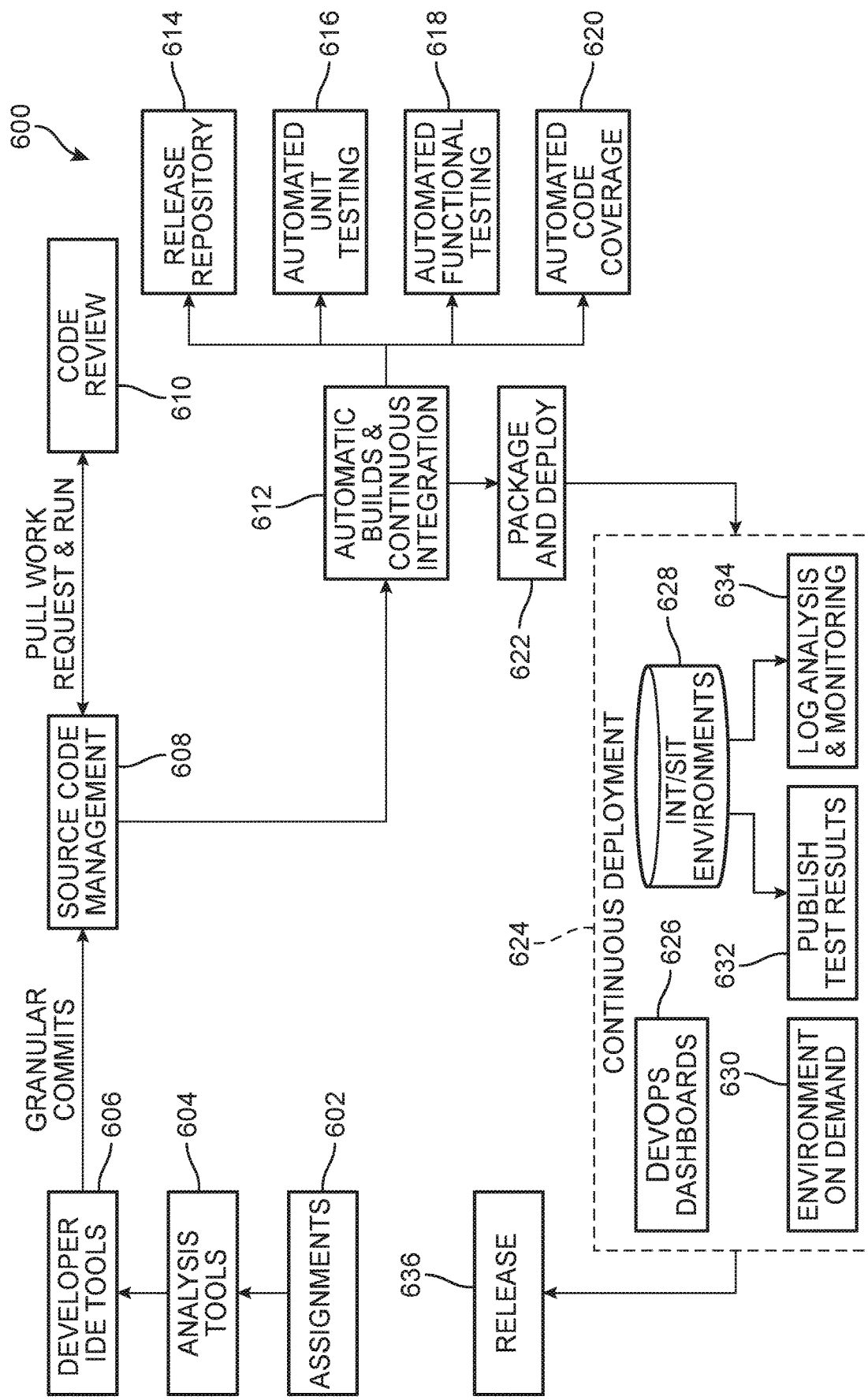
FIG. 6 shows a CI/CD pipeline, according to an embodiment.

FIG. 6 shows a DevOps CI/CD pipeline, according to an embodiment. Assignments 602 may be automatically distributed to team members. For example, the assignments may be provided via a team collaboration tool, such as IBM® Rational Team Concert, which allows developers to create personal dashboards that show information about the work items assigned to them. Rational Team Concert™ is a team collaboration tool that is built on a scalable, extensible platform. An example of an assignment may include assignments related to a mainframe application and/or an error in a mainframe application that needs to be resolved.

After assignments are assigned to team members, analysis tools 604 may be used to automatically analyze mainframe applications related to the assignments. An analysis tool may include, for example, an analytical platform, e.g., IBM® Application Discovery and Delivery Intelligence (ADDI), which uses cognitive technologies to analyze mainframe applications to quickly discover and understand interdependencies and impacts of change.

Then, developer integrated development environment (IDE) tools 606, e.g., IBM® Developer for z Systems, may be used to develop and edit source code, build automation tools, and debug, etc.

A source code management module 608, e.g., CA Endevor® Software Change Manager, can automatically track modifications to a source code repository (not shown). As shown in FIG. 6, the source code may be input into source code management module 608 in granular commits.

A code review module 610, e.g., software analyzer in Developer for z Systems (IDz), automatically reviews code based on how the code review module is configured. As shown by the double-sided arrow and words "pull work request and run" in FIG. 6, the source code may be iteratively tracked and modified.

Automatic builds and continuous integration 612 may be provided by an automation server, e.g., Jenkins. Then, artifacts that have fixed values and released versions of the builds may be saved in a release repository 614, e.g., a repository in IBM® Rational Team Concert™. Automated unit testing module 616, which may include, e.g., zUnit, automatically tests a section of the application at a time. Unit testing finds bugs early in the development process. The zUnit feature of Rational® Developer for z Systems™ provides a code-driven unit testing framework for Enterprise COBOL and PL/I. zUnit provides an automated solution for running and verifying Enterprise COBOL and PL/I unit test cases that are written by using the zUnit framework.

Automated functional testing module 618, which may include, e.g., IBM® Rational Test Workbench, can automatically test individual functions. Rational Test Workbench provides software testing tools to support a DevOps approach: API testing, functional UI testing, performance testing and service virtualization.

Automated code coverage module 620, which may include, e.g., IBM® IDz, monitors, records, and determines metrics for testing history.

Once testing is finished, the application may be packaged and deployed by a package and deploy module 622, which may be provided, e.g., IBM® UrbanCode. A continuous deployment module 624 can provide other services. For example, continuous deployment module 624 may provide an environment on demand 630, DevOps dashboards 626, and Integration/System Integration Testing (INT/SIT) environments 628. Environment on demand 630 may include, e.g., IBM® Rational Team Concert™ and/or IBM® Z® Development and Test Environment (ZD&T). DevOps dashboards 626 may be provided by a team collaboration tool e.g., IBM® Rational Team Concert™. INT/SIT environments 628 includes a publishing test results module 632 and a log analysis and monitoring module 634. Publishing test results module 632 may be provided by a team collaboration tool, e.g., IBM® Rational Team Concert™. Log analysis and monitoring module 634 may be provided by a fault analyzer feature and/or code coverage feature of a development environment, e.g., IBM® Rational Developer for z Systems (RDz).

After the designing, building, testing, deployment, and integration stages, a release 636 can finally happen.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of identifying and resolving computing errors, comprising:
   receiving a first log file that includes log records generated by an application;
   automatically identifying text indicating a first error in the first log file;
   automatically extracting error details from the first log file;
   automatically using the text indicating the first error and the error details to search a knowledge base and/or an external site for an existing solution for resolving the first error;
   upon finding a plurality of existing solutions when searching for an existing solution, automatically performing the following:
      determining whether accuracy is defined in the text accompanying each of the existing solutions,
      upon determining that accuracy is defined, automatically determining the existing solution of the plurality of existing solutions that has the highest defined accuracy, wherein the solution with the highest defined accuracy is the existing solution of the plurality of existing solutions that has a successful solution factor greater than 70% based on previous history of evaluation of the same existing solution, and
      implementing the existing solution with the highest defined accuracy; and
   storing the selected solution in knowledge base.

2. The computer implemented method of claim 1, further comprising:
   upon finding no solutions when searching for an existing solution, automatically storing a manual solution that has been implemented to resolve the first error in the knowledge base;
   receiving a second log file that includes log records generated by an application;
   automatically identifying text indicating a second error in the second log file, wherein the second error is the same type of error as the first error;
   automatically using the text indicating the second error to search the knowledge base for an existing solution for resolving the second error; and
   applying the existing solution used to resolve the first error to resolve the second error.

3. The computer implemented method of claim 1, further comprising:
   using a log maintenance and analytics framework to analyze the first log file and to generate a report based on analysis of the first log file; and
   automatically extracting error details from the report.

4. The computer implemented method of claim 3, wherein automatically using the text indicating the first error and the error details to search a knowledge base and/or an external site includes automatically using the error details from the report to search the knowledge base and/or the external site.

5. The computer implemented method of claim 1, wherein the solution with the highest defined accuracy is the existing solution of the plurality of existing solutions that has a successful solution factor greater than 80% based on previous history of evaluation of the same existing solution.

6. The computer implemented method of claim 1, wherein the solution with the highest defined accuracy includes the existing solution of the plurality of existing solutions that additionally has a problem statement or error that has multiple, repeated answers in the same external link and is marked as solved.

7. The computer implemented method of claim 1, further comprising:
   receiving a second log file that includes log records generated by an application;
   automatically identifying text indicating a second error in the second log file, wherein the second error is the same type of error as the first error;
   automatically using the text indicating the second error to search the knowledge base for an existing solution for resolving the second error; and
   applying the existing solution used to resolve the first error to resolve the second error.

8. A non-transitory computer-readable medium storing computing comprising instructions executable by one or more computers which, upon such execution, cause the one or more computers to:
   receive a first log file that includes log records generated by an application;
   automatically identify text indicating a first error in the first log file;
   automatically extract error details from the first log file;
   automatically use the text indicating the first error and the error details to search a knowledge base and/or an external site for an existing solution for resolving the first error;
   upon finding a plurality of existing solutions when searching for an existing solution, automatically perform the following:

determine whether accuracy is defined in the text accompanying each of the existing solutions, upon determining that accuracy is defined, automatically determine the existing solution of the plurality of existing solutions that has the highest defined accuracy, wherein the solution with the highest defined accuracy is the existing solution of the plurality of existing solutions that has a successful solution factor greater than 70% based on previous history of evaluation of the same existing solution, and implement the existing solution with the highest defined accuracy; and store the selected solution in knowledge base.

9. The non-transitory computer-readable medium storing computing of claim 8, wherein the instructions further cause the one or more computers to:

upon finding no solutions when searching for an existing solution, automatically store a manual solution that has been implemented to resolve the first error in the knowledge base;

receive a second log file that includes log records generated by an application;

automatically identify text indicating a second error in the second log file, wherein the second error is the same type of error as the first error;

automatically use the text indicating the second error to search the knowledge base for an existing solution for resolving the second error; and apply the existing solution used to resolve the first error to resolve the second error.

10. The non-transitory computer-readable medium storing computing of claim 8, wherein the instructions further cause the one or more computers to:

use a log maintenance and analytics framework to analyze the first log file and to generate a report based on analysis of the first log file; and automatically extract error details from the report.

11. The non-transitory computer-readable medium storing computing of claim 10, wherein automatically using the text indicating the first error and the error details to search a knowledge base and/or an external site includes automatically using the error details from the report to search the knowledge base and/or the external site.

12. The non-transitory computer-readable medium storing computing of claim 8, wherein the solution with the highest defined accuracy is the existing solution of the plurality of existing solutions that has a successful solution factor greater than 80% based on previous history of evaluation of the same existing solution.

13. The non-transitory computer-readable medium storing computing of claim 8, wherein the solution with the highest defined accuracy includes the existing solution of the plurality of existing solutions that additionally has a problem statement or error that has multiple, repeated answers in the same external link and is marked as solved.

14. The non-transitory computer-readable medium storing computing of claim 8, wherein the instructions further cause the one or more computers to:

receive a second log file that includes log records generated by an application;

automatically identify text indicating a second error in the second log file, wherein the second error is the same type of error as the first error;

automatically use the text indicating the second error to search the knowledge base for an existing solution for resolving the second error; and apply the existing solution used to resolve the first error to resolve the second error.

15. A system for automatically identifying and resolving computing errors, comprising:

one or more computers and one or more storage devices storing instructions that are operable, when executed by the one or more computers, to cause the one or more computers to:

receive a first log file that includes log records generated by an application;

automatically identify text indicating a first error in the first log file;

automatically extract error details from the first log file;

automatically use the text indicating the first error and the error details to search a knowledge base and/or an external site for an existing solution for resolving the first error;

upon finding a plurality of existing solutions when searching for an existing solution, automatically perform the following:

determine whether accuracy is defined in the text accompanying each of the existing solutions, upon determining that accuracy is defined, automatically determine the existing solution of the plurality of existing solutions that has the highest defined accuracy, wherein the solution with the highest defined accuracy is the existing solution of the plurality of existing solutions that has a successful solution factor greater than 70% based on previous history of evaluation of the same existing solution, and implement the existing solution with the highest defined accuracy; and store the selected solution in knowledge base.

16. The system of claim 15, wherein the instructions further cause the one or more computers to:

upon finding no solutions when searching for an existing solution, automatically store a manual solution that has been implemented to resolve the first error in the knowledge base;

receive a second log file that includes log records generated by an application;

automatically identify text indicating a second error in the second log file, wherein the second error is the same type of error as the first error;

automatically use the text indicating the second error to search the knowledge base for an existing solution for resolving the second error; and apply the existing solution used to resolve the first error to resolve the second error.

17. The system of claim 15, wherein the instructions further cause the one or more computers to:

use a log maintenance and analytics framework to analyze the first log file and to generate a report based on analysis of the first log file; and automatically extract error details from the report.

18. The system of claim 17, wherein automatically using the text indicating the first error and the error details to search a knowledge base and/or an external site includes automatically using the error details from the report to search the knowledge base and/or the external site.

19. The system of claim 15, wherein the solution with the highest defined accuracy is the existing solution of the plurality of existing solutions that has a successful solution factor greater than 80% based on previous history of evaluation of the same existing solution.

20. The system of claim 15, wherein the solution with the highest defined accuracy includes the existing solution of the plurality of existing solutions that additionally has a problem statement or error that has multiple, repeated answers in the same external link and is marked as solved.

\* \* \* \* \*